Patented July 18, 1950

2,515,949

UNITED STATES PATENT OFFICE 2,515,949

METHODS OF PRODUCING SOLS

Vincent Di Maio, Everett, Mass., assignor to Monsanto Chemical Company, St. Louis, Mo., a corporation of Delaware No Drawing. Application September 29, 1947, Serial No. 776,853

18 Claims. (Cl. 252—317)

The present invention relates to methods of preparing organo-aquasols and to methods of preparing aquasols of exceptionally high stability, that is, aquasols exhibiting no tendency to gel over long periods of time, and to sols so produced.

It is known to prepare acid reacting organo-aquasols and aquasols by first forming an aquasol containing an inorganic oxide and a dissolved inorganic salt, treating said aquasol with a water-miscible organic diluent either with or without cooling, removing the inorganic salt which is precipitated as a result of the organic diluent addition and then removing a substantial portion of the organic diluent from the resulting acid reacting organo-aquasol so as to form an acid reacting aquasol. The sols as prepared above possess only limited stability, for which reason they cannot be utilized in a practical manner for many commercial uses. These sols when converted to the alkaline condition by processes heretofore employed formed an irreversible gel which product could not be used in those instances where an alkaline reacting sol is required.

It is accordingly an object of the present invention to provide methods for the preparation of alkaline reacting sols from acid reacting sols of the type described above. A further object of the present invention is to prepare very stable aquasols from organo-aquasols.

Other objects and advantages of the invention will appear from the following description and appended claims.

The invention is in general carried out by first forming a substantially salt-free, acid reacting organo-aquasol containing an inorganic oxide, admixing a suitable quantity of this acid reacting sol and an appropriate quantity of a dilute alkaline solution comprising one or more alkaline compounds so as to form a colloidal solution within certain pH limits, and then removing substantially all of the organic diluent from said colloidal solution. If desired, more highly concentrated alkaline reacting aquasols may be obtained by removing a suitable quantity of water from the aquasols as prepared above, for example by boiling down or other suitable methods.

The above process yields aquasols which are substantially free of organic diluent, that is, contain not more than 0.5% organic diluent. Moreover, such aquasols are very stable for a considerable period of time, that is, for a period of 6 to 12 months or longer.

Acid reacting organo-aquasols for use according to the invention may be prepared in various ways, but should have a pH of from 2.0 to 4.0 In the case of silica sols, for example, they are preferably prepared by reacting an aqueous alkaline silicate, such as sodium silicate and an inorganic acid, as, for example, sulfuric acid in suitable proportions to provide a pH between 2.0 and 4.0. Any other suitable method may be employed, however, depending upon the particular inorganic oxide sol which it is desired to prepare. The resulting initial aquasols which contain an inorganic oxide and a dissolved inorganic salt, are then treated with a water-miscible organic diluent, as for example, ethanol and in some cases also cooled to precipitate the inorganic salt after which the inorganic salt is removed from the resulting acid reacting organo-aquasols by any suitable method as, for example, by centrifuging, filtration, decantation and the like.

As examples of water-miscible organic diluents which may be used for the precipitation of inorganic salt from the initial aquasols may be mentioned methyl alcohol, ethyl alcohol, 2-propanol, n-propanol, acetone, 2-methyl-2-propanol, monoethyl ether of ethylene glycol, monomethyl ether of ethylene glycol and the like. Of these the low boiling organic diluents such as acetone, ethyl alcohol, 2-propanol and 2-methyl-2-propanol are preferable since they may be readily removed, if desired, by heating at a temperature below the boiling point of water at the pressure used. In the case of high boiling water-miscible organic diluents, they may be removed from an aqueous solution in various ways as, for example, by heating, stripping with other organic solvents and the like. In order to facilitate the precipitation of inorganic salt, it is sometimes desirable to cool the aquasol during its preparation and during the addition of organic diluent. In such instances, the sol is preferably cooled to temperatures of 10° C. or lower.

The acid reacting organo-aquasols obtained as described above are converted to highly stable sols according to the present invention by mixing them with dilute alkaline solutions in amounts sufficient to obtain a pH in the resulting mixture between 9.0 and 10.0, and preferably between 9.3 and 9.6. The alkaline solution employed should preferably contain between 0.025 and 0.15 mol per liter of an alkaline compound or compounds, as unless dilute solutions are used, the sol tends to change over to the gel state. Moreover, the final sol will convert to a gel in a relatively short time unless it is maintained within the pH range referred to above. It is also desirable to mix the organo-aquasol and the alkali solution rapidly and with vigorous agitation to avoid localized pH conditions which favor the formation of a gel. Moreover, it is preferable to add the acid reacting sol to the alkali solution, although this is not essential if the mixing is carried out rapidly. The alkaline reacting sols prepared in this manner generally contain from 2.5 to 4.5% of inorganic oxide. Upon removing the alcohol or other organic diluent from these sols as by distillation or stripping with other organic solvents or the like, very stable aquasols are obtained which will not gel over long periods of time up to one year or more. The resulting sols may be further concentrated without loss of stability until they contain as much as 15% or more inorganic oxides, using either evaporation, simple distillation, vacuum distillation or any other suitable method for removing water.

As examples of alkaline solutions which may be used to alkalize acid reacting organo-aquasols as described above may be mentioned solutions containing one or more of such compounds as LiOH, NaOH, KOH, CsOH, quaternary ammonium bases and the like. Preferred alkaline solutions for use according to the invention are caustic soda solutions and/or caustic potash solutions.

A further understanding of the invention will be obtained from the following examples which are intended to be illustrative, but not limitative of the invention, all parts and percentages being by weight unless otherwise specified.

*Example I*

An acid reacting organo-aquasol is prepared in the following manner:

Three hundred and eighty-seven parts of clear, filtered commercial sodium silicate containing 28.4% $SiO_2$ and 9.0% $Na_2O$ are diluted with 160.5 parts of water. This mixture is added with vigorous agitation to 164 parts of a 34% aqueous solution of sulfuric acid. The temperature of this mixture is maintained at 10° C. during and after the acid addition. Seven hundred and forty-seven parts of 190 proof ethanol are added to the above mixture which is maintained at a temperature of 10° C. prior to and during the addition of ethanol. The ethanol addition and cooling causes the precipitation of sodium sulfate crystals which are removed by filtration. The resulting acid reacting ethanol-aquasol has a pH of about 3.0, and contains approximately 8.6% $SiO_2$, 0.5% $H_2O_4$ and 0.1% $Na_2SO_4$.

A very stable aquasol is prepared from the above organo-aquasol in the following manner:

Eleven hundred and sixty-four parts of a fresh, acid reacting ethanol-aquasol as prepared above are added rapidly and with vigorous agitation to 1396 parts of an alkaline solution comprising 0.4% of NaOH (carbonate free). The resulting alkaline reacting ethanol-aquasol has a pH of 9.4, a free alkalinity of 5% NaOH based on the weight of silica, and contains about 4% $SiO_2$. This alkaline reacting ethanol-aquasol is charged into a distillation chamber equipped with a condenser and the sol is heated until substantially all of the ethanol is removed from the distilland. The condenser is then removed and the heating is continued until sufficient water is evaporated to yield an aquasol comprising about 15% $SiO_2$. This aquasol has a pH of about 10.2 and contains, in addition to the silica, about 0.3% $Na_2SO_4$ and approximately 0.75% NaOH.

*Example II*

An acid reacting organo-aquasol is prepared in the same manner as described in Example I except that 747 parts of substantially anhydrous acetone are substituted for the ethanol. The resulting acid reacting acetone-aquasol has a pH of about 2.6, and contains approximately 8.6% $SiO_2$, 0.5% $H_2SO_4$ and 0.1% $Na_2SO_4$.

A very stable aquasol is prepared from the above organo-aquasol in the following manner:

Eleven hundred and sixty-four parts of a fresh, acid reacting acetone-aquasol as prepared above are rapidly added with vigorous agitation to 1396 parts of an alkaline solution comprising 0.4% NaOH (carbonate free). The resulting acid reacting acetone-aquasol has a pH of about 9.4, a free alkalinity of 5% NaOH based on the weight of silica and contains about 4% $SiO_2$. This acetone-aquasol is charged to a distillation chamber equipped with a condenser and the sol is heated until substantially all of the acetone is removed from the distilland. The condenser is then removed and heating is continued until sufficient water is evaporated to yield an aquasol comprising about 15% $SiO_2$. This aquasol has a pH of about 10.2 and contains, in addition to the silica, about 0.3% $Na_2SO_4$ and approximately 0.75% NaOH.

Silica aquasols as prepared in Examples I and II are clear sols possessing exceptional stability, that is, they are generally stable for periods up to 12 months or longer. Moreover, such sols may be diluted to concentrations of 0.1% silica or less without impaired stability and may be acidified at low concentrations to yield acid reacting aquasols which are stable for practical periods of time.

If it is desired to use an alkaline reacting organo-aquasol containing an inorganic oxide for any purpose as, for example, in the treatment of paper, textiles or the like so as to obtain a slip resistant finish or increase the strength of such materials, the alkaline reacting organo-aquasols prepared as hereinbefore described may be used.

Aquasols containing an inorganic oxide, such as silica aquasols prepared in accordance with the invention have a variety of commercial applications as, for example, in imparting to textiles a slip-resistant finish, as finishing agents for increasing the resistance of hosiery to runs and snags, as finishing agents for improving the strength of cotton yarns, paper and the like.

What is claimed is:

1. The method of preparing a relatively stable, alkaline reacting organo-aquasol containing silica which comprises admixing a dilute alkaline solution comprising from 0.025 to 0.15 mol per liter of alkaline compound and an acid reacting organo-aquasol containing silica, said acid reacting sol having a pH of from 2.0 to 4.0, said alkaline solution being supplied in an amount sufficient to provide a final mixture which is alkaline reacting.

2. The method of preparing a relatively stable, alkaline reacting organo-aquasol containing silica which comprises forming a colloidal solution having a pH of from about 9.0 to 10.0 by the admixture of suitable proportions of a dilute alkaline solution comprising from 0.025 to 0.15 mol per liter of alkaline compound and an acid reacting organo-aquasol containing silica, said acid reacting sol having a pH of from 2.0 to 4.0.

3. The method of preparing a relatively stable, alkaline reacting ethanol-aquasol containing silica which comprises forming a colloidal solution having a pH of from about 9.0 to 10.0 by the admixture of suitable proportions of a dilute alkaline solution and an acid reacting ethanol-aquasol containing silica, said alkaline solution comprising from 0.025 to 0.15 mol per liter of alkaline compound and said acid reacting sol having a pH of from 2.0 to 4.0.

4. The method of preparing a relatively stable, alkaline reacting acetone-aquasol containing silica which comprises forming a colloidal solution having a pH of from about 9.0 to 10.0 by the admixture of suitable proportions of a dilute alkaline solution and an acid reacting acetone-aquasol containing silica, said alkaline solution comprising from 0.025 to 0.15 mol per liter of alkaline compound and said acid reacting sol having a pH of from 2.0 to 4.0.

5. The method of preparing a relatively stable, alkaline reacting 2-propanol-aquasol which comprises forming a colloidal solution having a pH of from about 9.0 to 10.0 by the admixture of suitable proportions of a dilute alkaline solution and an acid reacting 2-propanol-aquasol containing silica, said alkaline solution comprising from 0.025 to 0.15 mol per liter of alkaline compound and said acid reacting sol having a pH of from 2.0 to 4.0.

6. The method of preparing a very stable aquasol containing silica which comprises admixing a dilute alkaline solution comprising from 0.025 to 0.15 mol per liter of alkaline compound and an acid reacting organo-aquasol containing silica, said acid reacting sol having a pH of from 2.0 to 4.0, said alkaline solution being supplied in an amount sufficient to provide a final mixture which is alkaline reacting, and removing substantially all organic diluent from the resulting mix.

7. The method of preparing a very stable aquasol containing silica which comprises forming a colloidal solution having a pH of from 9.0 to 10.0 by the admixture of suitable proportions of a dilute alkaline solution comprising from 0.025 to 0.15 mol per liter of alkaline compound and an acid reacting organo-aquasol containing silica, said acid reacting sol having a pH of from 2.0 to 4.0, and removing substantially all organic diluent from said colloidal solution.

8. The method of preparing a very stable aquasol containing silica which comprises forming a colloidal solution having a pH of from 9.0 to 10.0 by the admixture of a dilute alkaline solution and an acid reacting ethanol-aquasol containing silica, said alkaline solution comprising from 0.025 to 0.15 mol per liter of alkaline compound and said acid reacting sol having a pH of from 2.0 to 4.0, and removing substantially all of the ethanol from said colloidal solution.

9. The method of preparing a very stable aquasol containing silica which comprises forming a colloidal solution having a pH of from 9.0 to 10.0 by the admixture of a dilute alkaline solution and an acid reacting acetone-aquasol containing silica, said alkaline solution comprising from 0.025 to 0.15 mol per liter of alkaline compound and said acid reacting sol having a pH of from 2.0 to 4.0, and removing substantially all of the acetone from said colloidal solution.

10. The method of preparing a very stable aquasol containing silica which comprises forming a colloidal solution having a pH of from 9.0 to 10.0 by the admixture of a dilute alkaline solution and an acid reacting 2-propanol-aquasol containing silica, said alkaline solution comprising from 0.025 to 0.15 mol per liter of alkaline compound and said acid reacting sol having a pH of from 2.0 to 4.0, and removing substantially all of the 2-propanol from said colloidal solution.

11. The method of preparing a relatively stable, alkaline reacting organo-aquasol containing silica which comprises adding an acid reacting organo-aquasol containing silica to a dilute alkaline solution comprising from 0.025 to 0.15 mol per liter of alkaline compound with intimate mixing until the resuling mixture has a pH between about 9.0 to 10.0, said acid reacting sol having a pH of from 2.0 to 4.0.

12. The method of preparing a very stable organo-sol containing silica which comprises adding an acid reacting organo-aquasol containing silica to a dilute alkaline solution comprising from 0.025 to 0.15 mol per liter of alkaline compound with intimate mixing until the resulting mixture has a pH between about 9.0 to 10.0, said acid reacting sol having a pH of from 2.0 to 4.0, and removing substantially all organic diluent from said mixture.

13. The method substantially according to claim 2, but further characterized in that the alkaline compound is NaOH.

14. The method substantially according to claim 3, but further characterized in that the alkaline compound is NaOH.

15. The method substantially according to claim 7, but further characterized in that the alkaline compound is NaOH.

16. The method substantially according to claim 8, but further characterized in that the alkaline compound is NaOH.

17. The method substantially according to claim 9, but further characterized in that the alkaline compound is NaOH.

18. The method substantially according to claim 10, but further characterized in that the alkaline compound is NaOH.

VINCENT DI MAIO.

REFERENCES CITED

The following references are of record in the file of this patent:

UNITED STATES PATENTS

| Number | Name | Date |
|---|---|---|
| 2,285,449 | Marshall | June 9, 1942 |
| 2,285,477 | White | June 9, 1942 |
| 2,375,738 | White | May 8, 1945 |
| 2,377,842 | Marshall | June 5, 1945 |
| 2,386,247 | Marshall | Oct. 9, 1945 |
| 2,391,253 | Marshall | Dec. 18, 1945 |
| 2,391,255 | Marshall | Dec. 18, 1945 |